United States Patent
Kranzley et al.

(10) Patent No.: US 10,248,950 B2
(45) Date of Patent: *Apr. 2, 2019

(54) METHODS AND SYSTEMS TO SECURELY LOAD / RELOAD A CONTACTLESS PAYMENT DEVICE

(71) Applicant: MasterCard International Incorporated, Purchase, NY (US)

(72) Inventors: Arthur D. Kranzley, Pound Ridge, NY (US); John R. Wankmueller, Great Neck, NY (US); Duncan Garett, London (GB)

(73) Assignee: Mastercard International Incorporated, Purchase, NY (US)

( * ) Notice: Subject to any disclaimer, the term of this patent is extended or adjusted under 35 U.S.C. 154(b) by 182 days.

This patent is subject to a terminal disclaimer.

(21) Appl. No.: 15/245,903

(22) Filed: Aug. 24, 2016

(65) Prior Publication Data

US 2016/0364720 A1 Dec. 15, 2016

Related U.S. Application Data

(63) Continuation of application No. 12/537,084, filed on Aug. 6, 2009, now Pat. No. 9,454,865.

(60) Provisional application No. 61/086,733, filed on Aug. 6, 2008.

(51) Int. Cl.
| | |
|---|---|
| *G06Q 20/34* | (2012.01) |
| *G06Q 20/10* | (2012.01) |
| *G06Q 20/36* | (2012.01) |
| *G07F 7/08* | (2006.01) |
| *G06Q 20/40* | (2012.01) |

(52) U.S. Cl.
CPC ......... *G06Q 20/352* (2013.01); *G06Q 20/105* (2013.01); *G06Q 20/349* (2013.01); *G06Q 20/3672* (2013.01); *G06Q 20/409* (2013.01); *G06Q 20/4012* (2013.01); *G07F 7/08* (2013.01)

(58) Field of Classification Search
CPC .................................................... G06Q 20/382
USPC ........................................................ 705/73, 72
See application file for complete search history.

(56) References Cited

U.S. PATENT DOCUMENTS

| | | | | |
|---|---|---|---|---|
| 5,898,155 A | * | 4/1999 | Imai | G07F 19/20 235/379 |
| 6,587,835 B1 | * | 7/2003 | Treyz | G06Q 20/12 705/14.64 |
| 7,363,252 B2 | * | 4/2008 | Fujimoto | G06Q 20/105 455/344 |
| 7,708,194 B2 | * | 5/2010 | Vawter | G06Q 20/32 235/380 |

(Continued)

OTHER PUBLICATIONS

Backus, R M., Embedded systems security has moved to the forefront—Select and apply the proper certifications to enable system security, Embedded Systems Design 20.10 (Oct. 2007): p. 14. (Year: 2007).*

*Primary Examiner* — Alexis M Casey
(74) *Attorney, Agent, or Firm* — Buckley, Maschoff & Talwalkar LLC

(57) ABSTRACT

Embodiments allow loading and reloading contactless payment devices using only a contactless terminal interface, while providing user authentication. The contactless terminal interface could be at a merchant POS location, kiosk, or embedded or attached to a personal computing device with contactless read/write capability such as a personal computer or mobile phone or Internet device.

19 Claims, 4 Drawing Sheets

(56) References Cited

U.S. PATENT DOCUMENTS

| | | | |
|---|---|---|---|
| 7,729,986 B1* | 6/2010 | Hoffman | G06Q 20/04 |
| | | | 705/41 |
| 8,662,384 B2* | 3/2014 | Dodin | G06Q 20/02 |
| | | | 235/378 |
| 2002/0073024 A1* | 6/2002 | Gilchrist | G06Q 20/04 |
| | | | 705/39 |
| 2003/0065615 A1* | 4/2003 | Aschir | G06Q 20/10 |
| | | | 705/39 |
| 2005/0044042 A1* | 2/2005 | Mendiola | G06Q 20/04 |
| | | | 705/42 |
| 2005/0086164 A1* | 4/2005 | Kim | G06Q 20/102 |
| | | | 705/40 |
| 2005/0171898 A1* | 8/2005 | Bishop | G06Q 20/00 |
| | | | 705/39 |
| 2005/0187873 A1* | 8/2005 | Labrou | G06Q 20/02 |
| | | | 705/40 |
| 2007/0203836 A1* | 8/2007 | Dodin | G06Q 20/02 |
| | | | 705/44 |

\* cited by examiner

METHODS AND SYSTEMS TO SECURELY LOAD / RELOAD A CONTACTLESS PAYMENT DEVICE

CROSS-REFERENCE TO RELATED APPLICATION

This application is a continuation of U.S. application Ser. No. 12/537,084 filed on Aug. 6, 2009, which claims the benefit and priority to, U.S. Provisional Patent Application Ser. No. 61/086,733, filed on Aug. 6, 2008 the contents of which are hereby incorporated by reference in their entirety.

BACKGROUND

Embodiments disclosed herein relate to contactless payment systems. In particular, some embodiments relate to methods, apparatus, systems, means and computer program products for loading (or reloading) a contactless payment device with value. More particularly, some embodiments relate to loading (or reloading) a contactless payment device with value over a contactless interface.

Contactless payment devices, such as the PayPass® payment devices issued pursuant to standards developed by MasterCard International Incorporated, are becoming more widely used. PayPass® contactless payment devices (as well as a number of other contactless payment device schemes) follow standards, such as ISO standards and the EMV standards (available at www.emvco.com). The EMV standards set forth a security infrastructure in which payment device issuers create secure keys that are used to uniquely identify payment devices issued by them. The secure keys are also used by each issued payment device to uniquely identify and authenticate the issuer in payment device transactions. For example, in an online transaction (in which an EMV-compliant payment device is presented at a payment terminal via a contact chip card reader), the payment device is able to create a cryptogram that can be authenticated by the issuer, and likewise, the issuer is able to create a cryptogram that can be authenticated by the chip card. Unfortunately, these transactions require that the chip card be presented at a contact chip reading terminal (e.g., where the card is inserted into a chip card reader at a point of sale), as the transaction involves multiple steps and messages to be transmitted in several steps.

Certain types of transactions, such as transactions where value is loaded (or reloaded) onto a chip card currently require that such an authentication process take place, and therefore require that a chip card to be loaded be presented at a contact chip reading terminal. It would be desirable to allow contactless payment devices to be used in load transactions such that just a contactless chip card reader may be used while ensuring that the security and authentication features of the EMV standards be followed.

For example, one payment device application that has been developed and that is compliant with the EMV standards is a chip pre-authorized off-line load or reload transaction, where a chip on a payment device is loaded with value so that the value can be used in "off-line" transactions (i.e., transactions at terminals which are not in communication with a payment device issuer for verification or authentication of the transaction). An example of such an off-line transaction is a purchase of goods from a vending machine or other (typically) low-value transactions. A memory in the payment device stores information about the current value.

In order to load value onto the payment device, an on-line transaction must occur. Currently, the only way for a contactless payment device to be loaded with such value is for the contactless payment device to also support contact technology to be presented at an online transaction terminal which has a physical contact interface. Unfortunately, this requires that merchants or reload locations must deploy special dual interface (contact and contactless) reader/writers to enable consumers to reload value to their contactless payment device using the contact part of the card and terminal. Once loaded, the contactless payment device may be used to make purchases using the loaded amount using just the contactless interface which only requires that the merchant location to have just a contactless reader. What is required today is the use of dual-interface (contact and contactless) payment devices with the card's contact interface required for a load/reload transaction and subsequently the card's contactless interface used for all purchase transactions.

It would be desirable to provide an ability to securely load/reload value onto a contactless payment device in a manner that does not require dual-interface payment devices, and that does not require merchants or load locations to employ dual interface terminals. Further, it would be desirable to allow other form factor payment devices to be used in load/reload transactions. As an example, it would be desirable to provide contactless chips in cell phones, Mobile Internet Devices (MIDs) or other devices and allow those chips to be loaded/reloaded with value so that they may be used in off-line payment transactions at contactless terminals.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein.

DESCRIPTION

Figure 1:
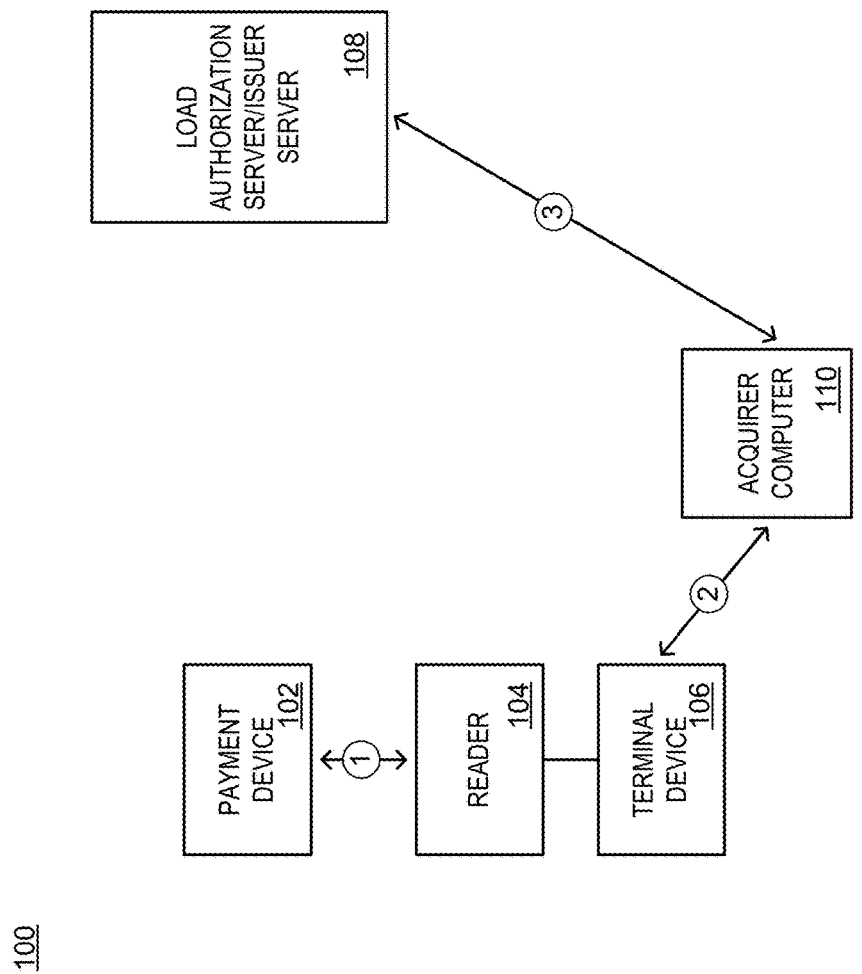
FIG. 1 is a block diagram that illustrates a system in which the present invention may be applied.

Pursuant to some embodiments, a secure, user-friendly and less expensive way of loading and reloading pre-paid contactless devices (such as a card or mobile phone) is provided. Embodiments allow loading and reloading contactless payment devices using only a contactless terminal interface, while providing user authentication. The contactless terminal interface could be at a merchant POS location, kiosk, or embedded or attached to a personal computing device with contactless read/write capability such as a personal computer or mobile phone or Internet device. Embodiments provide solutions to a number of problems in the field, including the problem of how to verify a cardholder in a secure manner before a local chip pre-authorized off-line amount is increased using purely contactless technology.

The result is a system (and methods) for securely loading/reloading value onto contactless payment devices without need for dual (contact and contactless) chips or terminals. As a result, the cost and complexity of deploying the system are reduced. Further, consumers, merchants and banks no longer have a different and confusing way (inserting a contactless chip physically into a contact reader) to reload pre-authorized off-line amounts into contactless chips for offline chip amounts that are subsequently spent in the contactless environment. Even further, consumers with non-card form factor chip applications on cell phones, Mobile Internet Devices (MIDs) or other devices with pre-authorized chip amounts will for the first time be able to reload their pre-authorized chip amount.

For simplicity and ease of exposition, a number of terms are used herein. For example, the terms "proximity payment device", "payment device", "payment card" or "contactless payment card" are used to refer to payment devices that use either radio frequency or infrared technology to allow a device to communicate with a terminal to conduct a payment transaction. For example, the terms may be used to refer to devices that are compliant with ISO/IEC 14443 Standard, ISO/IEC 18000 standard, or the NFC standards including ISO/IEC 18092/ECMA 340 and ISO/IEC 21481/ECMA 352. As a particular example, a "proximity payment device" may be further compliant with both the ISO/IEC 14443 Standard and the "PayPass" standards promulgated by MasterCard International Incorporated. A proximity payment device may have any of number of form factors. For example, a device may be formed in the shape of a traditional credit card (with an antenna and one or more chips embedded in a substrate). As another example, a device may be a small form factor integrated circuit chip which may be installed in another device, such as a mobile phone, a key fob, or the like, enabling the combined device to be used to conduct contactless payment transactions.

As used herein, the term "reader" or "terminal" is used to refer to a proximity coupling device that is capable of interrogating and reading data from a proximity payment device. In some embodiments, the reader may be incorporated into, or part of, the terminal. In some embodiments, the reader may be separate from (but in communication with) the terminal. A number of different types of terminals may be used, including, for example, traditional point of sale ("POS") terminals having contactless readers, computing devices (such as personal computers, handheld computers, or the like), etc.

As used herein, the term "Authorization Request Cryptogram" (or "ARQC") refers to a cryptogram that is generated by a payment device for transactions requiring online authorization. It is the result of payment device, terminal, and transaction data being encrypted by a secure key (e.g., such as a DES key). The ARQC is sent to the issuer in an authorization or other request, and is used by the issuer to validate the authenticity of the payment device.

The term "Authorization Response Cryptogram" (or "ARPC") refers to a cryptogram that is generated by a payment device issuer (or issuer processor) and is the result of the ARQC and the issuer's authorization response being encrypted by a key (e.g., such as a DES key). The ARPC is sent to the card in an authorization response message, and is used by the payment device to validate the authenticity of the payment device issuer.

The term "Pin Entry Device" (or "PED") refers to a secure device that allows a cardholder to enter their personal identification number (or "PIN").

Features of some embodiments of the present invention will now be described by first referring to FIG. 1 which is a block diagram that illustrates certain components of a system 100 in which the present invention may be applied. As shown, the system 100 includes a payment device 102, which is capable of contactless communication (e.g., the device 102 is a "proximity payment device" as described above). In particular, the payment device 102 is operable to engage in offline purchase transactions at transaction terminal devices 106 which have a contactless reader 104. Pursuant to some embodiments, the payment device 102 is a pre-paid contactless device which may be loaded (and reloaded) with value using features of the present invention.

For purposes of illustration, only one payment device 102 and only one terminal device 106 and reader 104 are shown in FIG. 1. However, in practice, the system 100 may encompass numerous payment devices 102 (belonging to numerous users), and may also include numerous terminals 106 and readers 104 capable of facilitating purchase and load/reload transactions in response to interactions with payment devices 102. Some, or all, of the terminal devices 106 may be operative to handle conventional online purchase transactions with contact, contactless, and/or magnetic stripe payment cards.

Details of an illustrative payment device 102 will be provided below in conjunction with FIG. 3, however, those skilled in the art will appreciate that a wide variety of payment devices 102 may be used in conjunction with embodiments of the present invention (including mobile telephones equipped with contactless payment chips, or the like).

The terminal device 106 may be a conventional point of sale (POS) terminal, or it may be a personal computer or other device configured to receive data from a payment device 102 via a reader 104 (and then communicate with an acquirer computer or similar payment processing entity). In some embodiments, the terminal device 106 includes a keypad or other data entry device as well as a display screen or user interface. The display screen (not shown) is used to communicate instructions to the cardholder and the keypad (not shown) is used to receive information and instructions from the cardholder (e.g., such as entry of a PIN and entry of other data).

In operation, a user (e.g., a "cardholder") who wishes to load (or reload) their payment device 102 with funds interacts with the terminal device 106 and selects a key or option which instructs the terminal device 106 that the cardholder wishes to load (or reload) funds onto a payment device 106. The cardholder may be prompted (via instructions on a screen or user interface of the terminal device 106) to select an amount to be loaded (or reloaded) onto the payment device 106. The cardholder enters the amount, and the terminal then prompts the cardholder to "tap" or present the payment device 102 to the reader 104 (otherwise known as a proximity coupling device) which is connected to, or in communication with, a terminal device 106. The reader 104 transmits an interrogation signal (shown generally as the communication path labeled as number "1") consisting of an electromagnetic field. The payment device 102 receives the interrogation signal via an antenna (not shown in FIG. 1), causing a radio-frequency identification chip (or "RFID IC", not shown in FIG. 1) to be powered-up.

The payment device 102 (under control of the RFID IC) then responds to the interrogation signal with data including, for example, a payment device account number and other information needed to initiate a load (or reload) transaction with the terminal device 106. In some embodiments, the payment device 102 causes a load authorization request message to be created. In some embodiments, the load authorization request includes the load amount identified by the cardholder as well as cryptographic data identifying the payment device (referred to herein as an Authorization Request Cryptogram or "ARQC"). The ARQC and the load authorization request are transmitted to the terminal device 106 over the contactless interface. At this point in time, the cardholder may remove the payment device 102 from communication with the reader 104. The RFID IC of the payment device 102 is operative to store information regarding the current status (or "state") of the load/reload transaction in a memory location (e.g., including the expected load or reload amount). This state information will be used later in the load/reload transaction as will be described further below.

The terminal device 106 transmits the load authorization request and the ARQC to the issuer (or to a load authorization server 108) via an acquirer 110 (or an acquirer agent or processor, shown as message number "2" in FIG. 1). For example, in some embodiments, the data is transmitted to a load authorization server via a payment processing network such as the BankNet® processing network operated by MasterCard International Incorporated, although other networks may also be used. The issuer (or the load authorization server 108 acting on behalf of the issuer) receives the load authorization request and attempts to verify the requested load (or reload) transaction by determining whether the transaction is valid (e.g., whether the cardholder has a valid source of funds that may be used to reload or load the requested amount onto the payment device 102). If the transaction is valid, the issuer (or the load authorization server 108) causes the funds to be debited from the cardholders source of funds, and credited to the payment device 102, and creates a load authorization response message (transmitted along communication path labeled "3" in FIG. 1) in an Authorization Response Cryptogram ("ARPC") message. The ARPC message is routed to the terminal device 106.

Upon receipt of the ARPC message, the terminal device 106 displays a prompt to the customer (or to a clerk if the terminal is an attended terminal) asking the customer to present the payment device 102 to the reader 104 again (e.g., by "tapping" the payment device 102 on the reader 104 or by otherwise bringing the payment device 102 in communication with the reader 104). When contactless communication is established between the payment device 102 and the reader 104, the terminal causes the ARPC to be transmitted to the payment device 102. The payment device 102, upon receiving the ARPC, retrieves the previously-stored "state" information and continues with a load/reload process. First, the payment device 102 verifies the ARPC to ensure that the ARPC was generated or signed by the issuer of the payment device 102 (or an authorized agent of the issuer). If the ARPC is verified, the payment device 102 transmits a PIN request message which is transmitted to the reader 104. The reader 104 (in cooperation with the terminal, in some embodiments), prompts the cardholder to enter his or her PIN (e.g., on a keypad or data entry device attached to the reader 104 or the terminal 106). The entered PIN is then transmitted, via the reader 104, to the payment device 102.

The payment device 102 compares the entered PIN with a stored PIN value to determine if the cardholder is authentic. In some embodiments, one or more retries may be allowed. If the PIN is validated, the payment device 102 operates to complete the load/reload transaction by opening a stored chip application and updating a stored load amount field with the newly loaded value. In this manner, the cardholder is authenticated, the issuer is authenticated, and value can be securely loaded onto a contactless payment device without need for a magnetic stripe or contact interface. The loaded value can then be used to conduct a wide variety of different transactions in off-line environments.

In some embodiments, the load authorization server or issuer server 108 is one that is operated by or on behalf of the issuing financial institution (not separately shown) which issued the payment device account associated with the payment device 102. The server computer 108 handles requests for loads/reloads from the payment device 102 (and other payment devices), and generally manages the user's activities in connection with his/her payment device account. For example, the server 108 may be used by the cardholder when the cardholder establishes a linked source of funds that is to be debited when funds are loaded onto the payment device 102.

Although only one server computer is shown in the drawing, in practice numerous issuers may participate in the system 108, and accordingly there may be a considerable number of server computers included in the system. However, for a given user, all of his/her transactions in connection with a particular payment device account will result in activity by the particular server computer operated by the issuer of his/her payment device account. Also, as will be seen, the functionality ascribed herein to the server computer 108 may in practice be divided among two or more intercommunicating and cooperating computers. For example, a "front end" server may handle load or reload requests, e.g., for customers of an alliance of issuers, or for all issuers in the system. The "front end" server may respond to the load/reload requests by referring requests for authorization to various "back office" computers each operated by or on behalf of a particular one of the issuers.

An acquirer computer 110 is also shown in FIG. 1 as being part of the system 100. The acquirer computer 110 may operate in a conventional fashion to receive from terminal devices 106 (or merchant/transaction processor computers coupled to POS terminals) data representing offline purchase transactions handled by the terminal devices 106. The acquirer computer 110 handles clearing for the offline purchase transactions such that the amounts due to the merchants which operate the terminal devices 106 are transferred from the issuers to the merchants. The acquirer computer 110 may be operated by or on behalf of the financial institution with which the merchant does its banking. In practice, the acquirer computer 110 may also handle conventional online purchase transactions (i.e., purchase transactions that require real-time communication with the card issuers for authorization or the like) where the transactions involve standard credit or debit cards.

There may be many financial institutions that participate in the system 100 as acquirers. Consequently, the system 100 may include many more acquirer computers than the single acquirer computer that is shown in the drawing.

Figure 2:
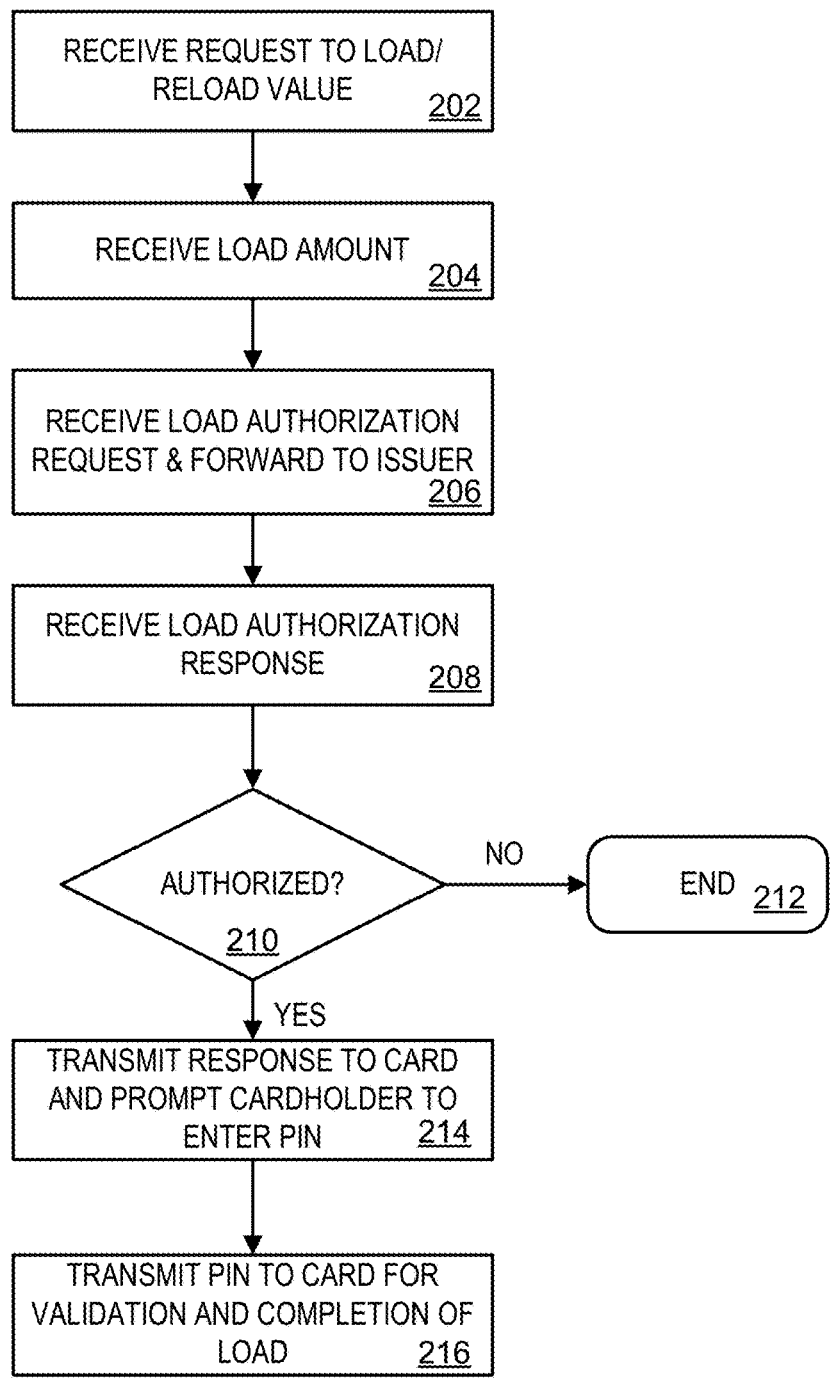
FIG. 2 is a flow chart that illustrates a load/reload process that may be performed by the system of FIG. 1 in accordance with some embodiments of the present invention.

Operation of the system 100 of FIG. 1 will now be described by reference to the flow diagram 200 of FIG. 2. In general, the steps shown in the process of FIG. 2 may be performed in a different order (or in conjunction with other steps). The process 200 may be performed, for example, by a terminal device 106 (in conjunction with a reader 104 interacting with a payment device 102, and with a load authorization server or issuer server 108) as shown in FIG. 1.

The process 200 begins at 202 where the terminal receives a request to load or reload value onto a contactless payment device. For example, processing at 202 may involve a customer interacting with a keypad or data entry device of a point of sale terminal to select an option to load or reload funds. Processing continues at 204 where a load amount is received. Again, this may be received at a terminal when a customer enters a desired amount to be loaded onto his or her payment device. Processing at 204 may also involve the terminal (via a contactless reader) initiating communication with the customers contactless payment device (as is described in further detail elsewhere in this disclosure). At 206, the terminal receives a load authorization request message which includes, for example, a cryptogram signed by the payment device as well as the requested load amount. The terminal causes this load authorization request message to be forwarded to an issuer processor (such as the device 108 of FIG. 1) for authorization processing.

Processing continues at 208 where an authorization response is received at the terminal. The authorization response, in some embodiments, includes a cryptogram signed by the issuer (or an agent of the issuer) of the payment device. The cryptogram also includes an authorization response message which indicates whether the requested load transaction can be completed or not. The terminal determines, at 210, if the issuer authorized the load transaction. If so, processing continues at 214. If not, processing continues at 212 and the requested load transaction completes without funds being loaded onto the payment device.

Processing at 214 includes transmitting the authorization response cryptogram to the payment device (via a contactless interface) and prompting the cardholder to enter their PIN (after the terminal receives a PIN request to the terminal via the contactless interface). The cardholder enters their PIN (e.g., via a keypad or other data entry device associated with the terminal) and forwards the PIN to the payment device (again via the contactless interface). The payment device then determines if the PIN is valid, and, if so, causes a memory of the payment device to be updated with the load amount (e.g, thereby increasing the available off-line balance of funds in the payment device).

Those skilled in the art will appreciate that a number of variations and features may be provided with this load or reload process; however, the basic result is that a contactless payment card may be loaded (or reloaded) with value at contactless terminals. Further details will be provided below.

Figure 3:
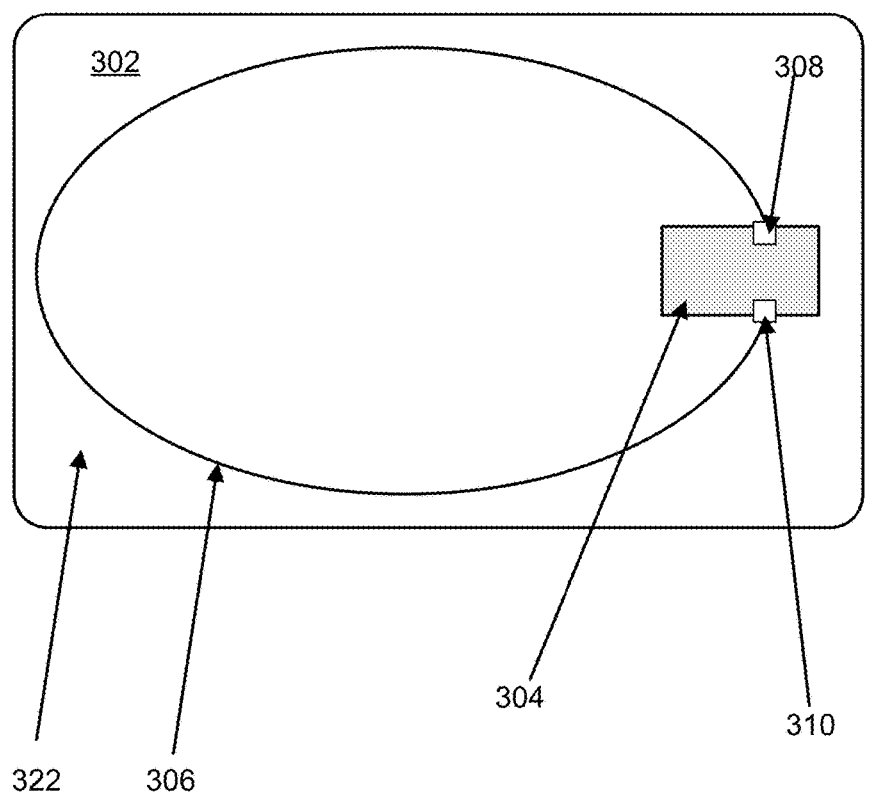
FIG. 3 is a block diagram that illustrates a proximity payment device that may be employed as a payment device in connection with the system of FIG. 1 and that is provided in accordance with some embodiments of the present invention.

FIG. 3 is a schematic plan view of a proximity payment device 300 according to some embodiments. In the embodiment shown, the proximity payment device 300 has a body 302, which may resemble conventional payment cards in shape and size. The body 302 may be formed of plastic or another suitable material. Embodiments of the present invention may be shaped or formed in any of a number of ways, and need not be formed in the shape of a card. For example, embodiments of the present invention may be shaped or formed as key fobs, embedded in mobile telephones, or in any other form factor so long as the components described below are provided in the device.

The proximity payment device 300, no matter the form or shape of the carrier, includes an RFID IC 304. The RFID IC 304 may be mounted and/or installed in any suitable manner in the body 302. For example, the RFID IC 304 may be embedded (partially or completely) in the body 302. The RFID IC 304 may be suitably designed and configured to transmit payment device account information (or other personal information) by radio frequency signaling to a POS terminal or other reader. In some embodiments, including the illustrative embodiment to be discussed herein, the RFID IC 304 may be designed and configured to operate in accordance with the "PayPass" standard promulgated by MasterCard International Incorporated, the assignee hereof.

The proximity payment device 300 may further include an antenna 306 embedded in or otherwise mounted on the body 302. As shown, the antenna 306 may be in the form of several loops arranged along the periphery of the body 302. Alternatively, the antenna 306 may be of a different type and/or configuration. The antenna may be operative generally in accordance with the above-mentioned PayPass standard to receive interrogation and power signals (which may be the same signal) from a proximity coupling device of a terminal device and to transmit payment device account number information and/or other information to the proximity coupling device. The antenna 306 may be coupled to the RFID IC 304 via terminals 308, 310, each coupled to a respective end of the antenna 306.

In some embodiments, lettering (not shown in FIG. 3) or other symbols (not shown in FIG. 3) may be present on the front surface 322 of the body 302 and/or on the rear surface (not shown) of the body 302. The proximity payment device 300 may have one or more magnetic stripes (not shown) on the body 302 to allow the proximity payment device 100 to be read by a magnetic card reader. In addition, or alternatively, there may be embossed numbers and/or letters on the card-shaped body to indicate one or more account numbers and/or the name of the holder of the proximity payment device 300. In addition, or alternatively, non-embossed printing on the front surface 322 may indicate the account numbers and/or the holder's name. Still further, the front surface 322 of the body 302 may carry one or more logos and/or brands, including for example the brand/logo of an international payment card association such as MasterCard International Incorporated. The brand/logo of the issuer may also be present, as well as, for example, a specific card product brand. Other conventional features that may be present on the proximity payment device 300 (though such features are not shown) are an adhesive paper strip to receive the signature of the cardholder, and a security code or the like printed on the adhesive strip.

As discussed above, embodiments of the present invention may be used with any of a number of types and shapes of proximity information device. The above example, relating to a particular embodiment of proximity payment device, is provided as illustration only. Those skilled in the art will recognize that proximity information devices may be configured as keyfobs, tokens, or any of a number of different configurations. Embodiments of some aspects of the invention have heretofore been described with reference to a card-shaped proximity payment device, but the teachings disclosed herein are also applicable to proximity payment devices which are not card-shaped as well as other proximity information devices. Although not indicated in the drawings, one or more of the proximity information devices may have a contact interface like that of a conventional smart card that includes a contact interface.

Figure 4:
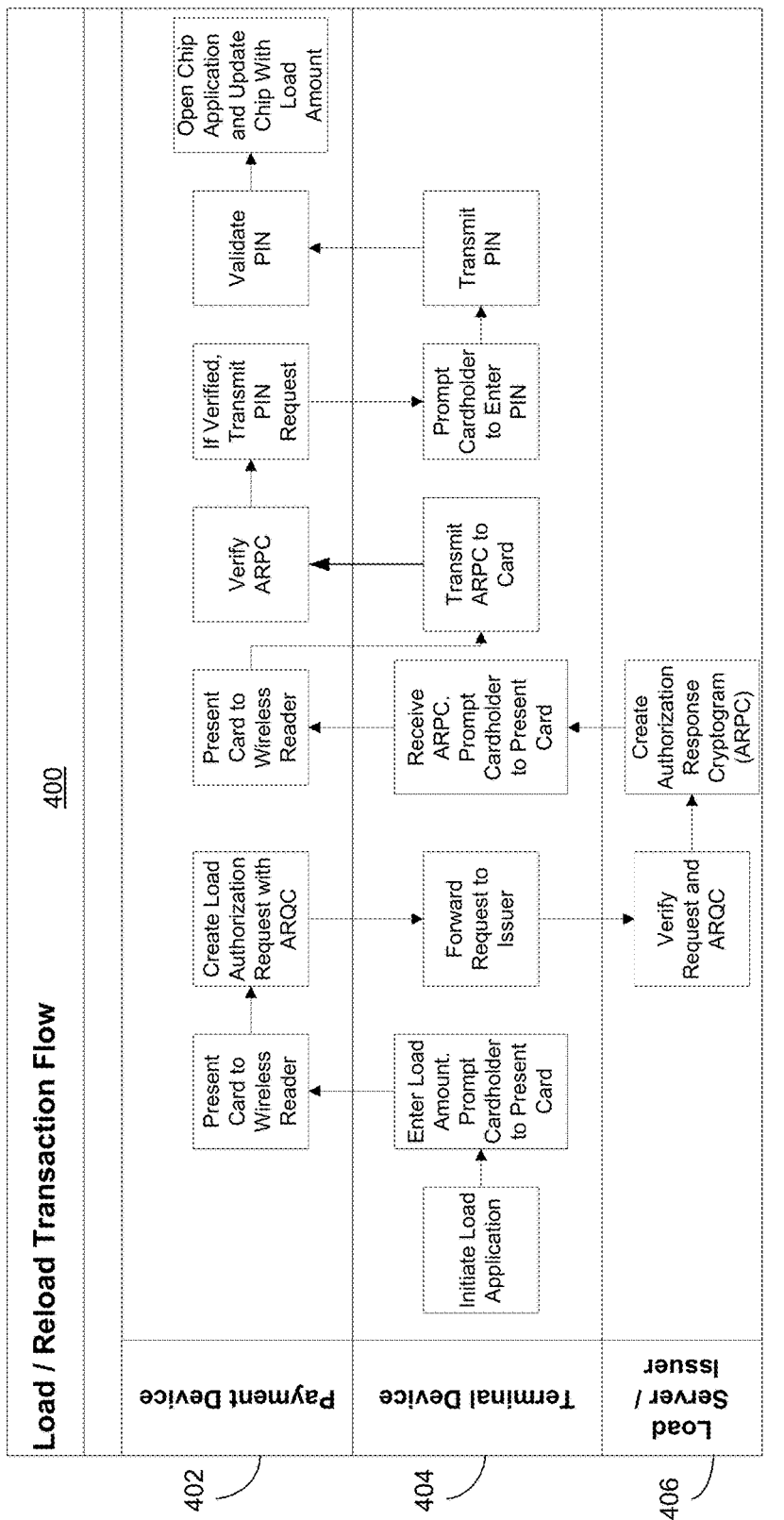
FIG. 4 is a transaction diagram that illustrates features of some embodiments.

Features of some embodiments will now be described by reference to FIG. 4 where a load/reload transaction flow diagram 400 is shown. In the transaction flow diagram 400, three primary entities are involved in each load/reload transaction: a cardholder (with an associated payment device 402), a terminal 404 (e.g., such as a personal computer, a point of sale device, or other device having a contactless card reader), and a load server/issuer 406. In some embodiments, the load server/issuer 406 are in communication with the terminal 404 over a network (e.g., such as the Internet, or other communications network).

Pursuant to some embodiments, a load/reload transaction begins with a cardholder interacting with the terminal 504 to initiate a load application. In some embodiments, where the terminal device 504 is an attended load terminal, the load application may be initiated by a clerk or other attendant. In some embodiments, where the terminal device 504 is a personal computer (e.g., such as a personal computer owned or operated by the cardholder), the load application may be initiated by launching a load applet or application. Processing continues with the cardholder entering or selecting the desired load (or reload) amount.

The load application prompts the cardholder to present their contactless card to the contactless card reader associated with the terminal device 504. This may be done by simply tapping or moving the contactless payment device near the contactless terminal. When the card is sufficiently close to the terminal, a standard EMV-compliant interaction (e.g., such as an interaction pursuant to the PayPass® standard) occurs between the terminal and the contactless payment device, which causes a chip on the contactless payment device to generate an authorization request cryptogram.

When the protocol run by the contactless card ends, an online authorization request message has been created with, for example, data identifying the requested load amount (e.g., in one illustrative embodiment, pursuant to a PayPass online authorization request standard) with an EMV ARQC. Pursuant to embodiments of the present invention, unlike previous load authorizations, no user verification has been performed at this point. That is, no PIN validation has yet occurred.

Processing continues as the contactless card provides the authorization request to the terminal, which acts to forward or route the authorization request to the issuer via the payment network 506. For example, in an embodiment where the terminal device 504 is a PC, the PC contactless reader application sends the authorization request to the issuer in any manner known in the art. For example the authorization message could be protected in an SSL session or any other convenient means. During this stage of the transaction, the cardholder may be instructed (or permitted) to remove their contactless payment device from the terminal (e.g., such as from the PC's contactless read/write area).

Processing continues as the issuer verifies the authorization request (including verifying the ARQC to confirm that the contactless payment device is authentic). In some load/reload transactions, the issuer already knows the cardholder's preferred funding source for load/reload transactions. The contactless payment device issuer, upon receipt of the authorization message, authenticates the cryptographically signed ARQC in the received message, including the requested reload amount. If the message is good (cryptographically valid) and if there are sufficient reload funds available from the client funding source, the issuer sends back to the terminal device 504 a normal issuer signed EMV ARPC authorization response message with information on reload request status and any instructions (signed scripts) for the contactless payment device regarding the reload request. If the message is not approved by the issuer, a decline message is returned and the transaction and process ends.

Where the authorization request is approved by the issuer, the process 500 continues with the terminal device 504 prompting the cardholder to represent their contactless payment device to the terminal's contactless read/write terminal. The terminal device 504 application then contactlessly sends the signed ARPC authorization response message with information on the status regarding the reload request and any EMV signed script instruction commands to the contactless payment device 502. The ARPC response or script commands provide updated user contactless payment device offline pre-authorized off-line amount counters that can increase the amount of value stored in a chip of the contactless payment device. However, pursuant to embodiments of the present invention, the chip of the contactless payment device will not commit any change to the pre-authorized off-line amount counters until the user has been authenticated (as described below).

Processing continues with the contactless payment device 502 operating to verify the ARPC message. In order to authenticate the user, the contactless payment device authenticates the cryptographically "issuer signed" ARPC message as normal except that it is verified against the ARQC request of the previous transaction (as the chip has been presented for a second time). To allow this, embodiments of the present invention allow the contactless payment device to remember or preserve it's "state" by setting a flag or storing a record of the end of processing in the previous steps (e.g., the "state" of the contactless payment device as a result of the first presentment of the payment device 502 to the terminal device 504, shown as transaction step (1) on FIG. 5 is preserved). In this manner, the load/reload transaction can encompass several different presentments of the contactless payment device 502 to the terminal device 504. The first presentment (at item (1)) results in the creation of the authorization request and the ARQC. The second presentment (at item (2)) picks up or resumes with the data from item (1).

When the contactless payment device 502 is represented at (2) to the contactless reader, the contactless payment device 502 does not yet have proof that the correct user is present. That is, the user's PIN has yet to be verified. Pursuant to embodiments of the present invention, after the cardholder's contactless payment device authenticates the issuer produced ARPC, the card has proof that it is in communication with the correct and authenticated issuer. Further, by virtue of the fact that the contactless payment device 502 successfully received the ARPC, the payment device 502 can be confident that it is, in fact, in communication with a legitimate terminal. Put another way, the contactless payment device 502 knows that it is not in communication with a random unknown contactless reader phishing to have the contactless chip check if a PIN value sent to it is correct.

Processing continues with the contactless payment device 502 transmitting a PIN request message to the terminal device 504. That is, only after the contactless payment device 502 has confirmed that it has just communicated with it's issuer (by virtue of having just received and verified the dynamic transaction specific ARPC message), does the contactless chip application open up and allow the cardholder's PIN to be verified by it. The cardholder's PIN is obtained by sending a transaction certificate (TC) message, as in a normal EMV payment transaction, back to the terminal device 504 telling the terminal that the chip has authenticated the issuer and is now awaiting a PIN to locally verify the cardholder. The terminal application, upon receipt of the TC, now prompts the cardholder for the PIN, which the cardholder enters into the terminal device 504 interface through the keyboard, attached encrypting PIN PAD or other input means. The cardholder is asked to tap (or still has) their contactless chip within the contactless read/write area. In some embodiments a trusted Pin Entry Device (PED) function, using the existing EMV enciphered PIN mechanism, sends the PIN in encrypted form to the chip of the contactless payment device 502 to avoid eavesdropping. The enciphered PIN is locally off-line validated by the chip. If the PIN is verified locally by the chip, the reload amount is accepted by it and its internal pre-authorized off-line amount counters updated.

In this manner, the chip of the contactless payment device 502 has been protected from rogue attacks trying to guess its stored PIN value and an attacker trying to see the entered PIN value as it is wirelessly sent to the chip.

In this embodiment, as described in conjunction with FIG. 5, cardholder interacts with a contactless reload terminal device 504 (such as a contactless merchant POS, Kiosk, PC, cell phone, or MID device) with contactless read/write capability (such as the emerging Near Field Communication (NFC) standard) at two or three separate times (shown as items (1), (2) and (3) in FIG. 1). In some embodiments, only a single interaction may be required. For example, rather than requiring the cardholder to remove the payment device from the contactless reader at (1), the cardholder may be permitted to leave the contactless payment device 502 in communication with the contactless card reader/writer of the terminal device 504 until the multi-step reload process is completed.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims. For example, in some embodiments, the issuer's ARPC response is presented to the chip and validated prior to the user's PIN being presented to the chip and validated. Update of the pre-authorized off-line amount only occurs after the successful verification of the PIN. In some embodiments, cardholder's PIN is sent to the contactless payment device first but is not verified (any indication of correctness of the PIN is not given) until after the ARPC response is subsequently sent to the contactless payment device and successfully verified—only then is the PIN verified and if correct, the pre-authorized off-line amount updated. In still further embodiments, the cardholder's PIN and the issuer's APRC response are sent to the chip of the contactless payment device 102 at the same time but the contactless chip only verifies the correctness of the PIN after the successful verification of the issuer's ARPC response and then only updates the pre-authorized off-line amount if the PIN is correct.

What is claimed is:

1. A method for operating a terminal device, comprising:
receiving, by the terminal device, a request for a load transaction for loading value onto a contactless payment device, the request including a requested load amount;
prompting a user, by the terminal device, to present the contactless payment device to a contactless reader operatively coupled to the terminal device;
presenting the contactless payment device to the contactless reader;
establishing a wireless data communication channel between the contactless payment device and the contactless reader in connection with the load transaction;
transmitting an authorization request from the contactless payment device to the contactless reader over the wireless data communication channel, said authorization request for requesting authorization from a remote server computer for said load transaction, said authorization request different from said request for a load transaction;
receiving, by the contactless reader from said contactless payment device over the wireless data communication channel, the authorization request;
transmitting, by the terminal device, said authorization request electronically over a communication channel to the remote server computer, the remote server computer associated with a destination address, the remote server computer operated by or on behalf of an issuer of said contactless payment device for authorization processing;
receiving, by the terminal device, a signed authorization response from said remote server computer indicating approval of the authorization request;
after the terminal device receives the signed authorization response, prompting the user, by the terminal device, to present the contactless payment device to the contactless reader;
second presenting the contactless payment device to the contactless reader;
establishing the wireless data communication channel for a second time in connection with said load transaction;
transmitting, by the contactless reader to the contactless payment device over the wireless data communication channel, the signed authorization response for authentication by the contactless payment device;
transmitting a transaction certificate from the contactless payment device to the contactless reader over the wireless data communication channel;
receiving, by the contactless reader over the wireless data communication channel, the transaction certificate from the contactless payment device indicating authentication of the issuer;
displaying, by the contactless reader, a prompt to enter a personal identification number (PIN);
receiving, by the terminal device via an input device, the PIN from the user;
third presenting the contactless payment device to the contactless reader;
establishing the wireless communication channel for a third time in connection with said load transaction;
transmitting, by the contactless reader over the wireless data communication channel, an encrypted version of the PIN to the contactless payment device;
verifying of the encrypted version of the PIN by the contactless payment device to verify the user; and
accepting said request for the load transaction by the contactless payment device.

2. The method of claim 1, wherein said authorization request includes said requested load amount.

3. The method of claim 1, wherein said transmitting said authorization request is performed over a payment network.

4. The method of claim 1, wherein said issuer is at least one of: the issuer of said contactless payment device, and an agent of said issuer.

5. The method of claim 1, wherein said contactless payment device comprises a mobile device.

6. The method of claim 5, wherein said mobile device is a mobile phone.

7. The method of claim 1, wherein the request for the load transaction is received at a data entry device associated with said terminal device.

8. A method for operating a terminal device, comprising:
receiving, by the terminal device, a request for a load transaction for loading value onto a contactless payment device, the request including a requested load amount;
prompting a user, by the terminal device, to present the contactless payment device to a contactless reader operatively coupled to the terminal device;
presenting the contactless payment device to the contactless reader;
establishing a wireless data communication channel between the contactless payment device and the contactless reader in connection with the load transaction;
transmitting an authorization request from the contactless payment device to the contactless reader over the wireless data communication channel, said authorization request for requesting authorization from a remote server computer for said load transaction, said authorization request different from said request for a load transaction, said authorization request including a cryptogram;
receiving, by the contactless reader from said contactless payment device over the wireless data communication channel, the authorization request;
transmitting, by the terminal device, said authorization request electronically over a communication channel to the remote server computer, the remote server computer associated with a destination address, the remote server computer operated by or on behalf of an issuer of said contactless payment device for authorization processing, said authorization processing including verifying the cryptogram;
receiving, by the terminal device, a signed authorization response from said remote server computer indicating approval of the authorization request;
after the terminal device receives the signed authorization response, prompting the user, by the terminal device, to present the contactless payment device to the contactless reader;
second presenting the contactless payment device to the contactless reader;
establishing the wireless data communication channel for a second time in connection with said load transaction;
transmitting, by the contactless reader to the contactless payment device over the wireless data communication channel, the signed authorization response for authentication by the contactless payment device;
authenticating the signed authorization response in the contactless payment device;
third presenting the contactless payment device to the contactless reader;
establishing the wireless communication channel for a third time in connection with said load transaction;
transmitting a transaction certificate from the contactless payment device to the contactless reader over the wireless data communication channel; and
receiving, by the contactless reader over the wireless data communication channel, the transaction certificate from the contactless payment device indicating authentication of the issuer.

9. The method of claim 8, wherein said authorization request includes said requested load amount.

10. The method of claim 8, wherein said transmitting said authorization request is performed over a payment network.

11. The method of claim 8, wherein said issuer is at least one of: the issuer of said contactless payment device, and an agent of said issuer.

12. The method of claim 8, wherein said authorization processing includes verifying the cryptogram and determining whether funds are available to be loaded onto said contactless payment device.

13. The method of claim 12, wherein said determining whether funds are available includes verifying a funding source associated with the user of said contactless payment device.

14. The method of claim 8, wherein said contactless payment device comprises a mobile device.

15. The method of claim 14, wherein said mobile device is a mobile phone.

16. The method of claim 8, wherein the request for the load transaction is received at a data entry device associated with said terminal device.

17. A method for operating a terminal device, comprising:
receiving, by the terminal device, a request for a load transaction for loading value onto a contactless payment device, the request including a requested load amount;
prompting a user, by the terminal device, to present the contactless payment device to a contactless reader operatively coupled to the terminal device;
presenting the contactless payment device to the contactless reader;
establishing a wireless data communication channel between the contactless payment device and the contactless reader in connection with the load transaction;
transmitting an authorization request from the contactless payment device to the contactless reader over the wireless data communication channel, said authorization request for requesting authorization from a remote server computer for said load transaction, said authorization request different from said request for a load transaction;
receiving, by the contactless reader from said contactless payment device over the wireless data communication channel, the authorization request;
transmitting, by the terminal device, said authorization request electronically over a communication channel to the remote server computer, the remote server computer associated with a destination address, the remote server computer operated by or on behalf of an issuer of said contactless payment device for authorization processing;
receiving, by the terminal device, an authorization response from said remote server computer indicating approval of the authorization request;
after the terminal device receives the authorization response, prompting the user, by the terminal device, to present the contactless payment device to the contactless reader;
second presenting the contactless payment device to the contactless reader;
establishing the wireless data communication channel for a second time in connection with said load transaction;
transmitting, by the contactless reader to the contactless payment device over the wireless data communication channel, the authorization response;
transmitting a transaction message from the contactless payment device to the contactless reader over the wireless data communication channel;

receiving, by the contactless reader over the wireless data communication channel, the transaction message from the contactless payment device;

displaying, by the contactless reader, a prompt to enter a personal identification number (PIN);

receiving, by the terminal device via an input device, the PIN from the user;

third presenting the contactless payment device to the contactless reader;

establishing the wireless communication channel for a third time in connection with said load transaction;

transmitting, by the contactless reader over the wireless data communication channel, an encrypted version of the PIN to the contactless payment device;

verifying of the encrypted version of the PIN by the contactless payment device to verify the user; and accepting said request for the load transaction by the contactless payment device.

18. The method of claim 17, wherein said contactless payment device comprises a mobile device.

19. The method of claim 18, wherein said mobile device is a mobile phone.

\* \* \* \* \*